United States Patent
Tsudaka et al.

(10) Patent No.: US 12,037,715 B2
(45) Date of Patent: Jul. 16, 2024

(54) SEMI-AROMATIC POLYAMIDE FIBER AND METHOD FOR PRODUCING SAME

(71) Applicant: KURARAY CO., LTD., Kurashiki (JP)

(72) Inventors: Takeshi Tsudaka, Kurashiki (JP); Shohei Tsunofuri, Chiyoda-ku (JP); Yosuke Washitake, Kurashiki (JP)

(73) Assignee: KURARAY CO., LTD., Kurashiki (JP)

( * ) Notice: Subject to any disclaimer, the term of this patent is extended or adjusted under 35 U.S.C. 154(b) by 969 days.

(21) Appl. No.: 17/023,532

(22) Filed: Sep. 17, 2020

(65) Prior Publication Data
US 2021/0002791 A1 Jan. 7, 2021

Related U.S. Application Data

(63) Continuation of application No. PCT/JP2019/011367, filed on Mar. 19, 2019.

(30) Foreign Application Priority Data

Mar. 23, 2018 (JP) .................................. 2018-056305

(51) Int. Cl.
| | | |
|---|---|---|
| *D01F 6/60* | (2006.01) | |
| *C08G 69/26* | (2006.01) | |
| *C08K 5/00* | (2006.01) | |
| *C08K 5/20* | (2006.01) | |
| *D01D 5/08* | (2006.01) | |

(52) U.S. Cl.
CPC ........... *D01F 6/605* (2013.01); *C08G 69/265* (2013.01); *C08K 5/0016* (2013.01); *D01D 5/08* (2013.01); *C08K 5/20* (2013.01)

(58) Field of Classification Search
CPC ... D01F 6/605; D01F 1/10; D01F 6/60; D01F 6/805; D01F 6/90; C08G 69/265; C08G 69/26; D01D 5/08; C08K 5/20; C08K 5/0016
See application file for complete search history.

(56) References Cited

U.S. PATENT DOCUMENTS

| | | | |
|---|---|---|---|
| 4,842,797 A | 6/1989 | Matsumura et al. | |
| 5,075,168 A | 12/1991 | Maruyama et al. | |
| 6,989,198 B2 * | 1/2006 | Masuda | B32B 27/28 |
| | | | 428/474.9 |
| 2005/0221708 A1 | 10/2005 | Shigematsu et al. | |

FOREIGN PATENT DOCUMENTS

| | | | | |
|---|---|---|---|---|
| JP | 63-254138 A | 10/1988 | | |
| JP | 02-251611 A | 10/1990 | | |
| JP | 09-013222 A | 1/1997 | | |
| JP | 2004-221023 A | 8/2004 | | |
| JP | 2005-273034 A | 10/2005 | | |
| JP | 2005273034 A * | 10/2005 | ............... | D01F 6/60 |
| JP | 2009-298852 A | 12/2009 | | |
| JP | 2009298852 A * | 12/2009 | ............... | C08L 77/06 |
| JP | 2014-095065 A | 5/2014 | | |
| TW | 201631035 A | 9/2016 | | |
| WO | WO2005102681 A1 * | 3/2008 | ............... | B32B 1/08 |
| WO | WO 2016/139826 A1 | 9/2016 | | |
| WO | WO-2016139826 A1 * | 9/2016 | ............... | C08K 5/06 |

OTHER PUBLICATIONS

Machine Translation of JPWO2005102681 (Year: 2008).*
Machine Translation of WO2016139826 (Year: 2016).*
Korean Grant of Patent issued on Mar. 14, 2022 in Korean Patent Application No. 10-2020-7026775 (with English translation), 3 pages.
International Search Report issued Jun. 18, 2019 in PCT/JP2019/011367 filed on Mar. 19, 2019, 1 pages.
Extended European Search Report issued Nov. 26, 2021 in European Patent Application No. 19772070.9, 8 pages.
Korean Office Action issued Dec. 10, 2021 in Korean Patent Application No. 10-2020-7026775 (with unedited computer generated English translation), 12 pages.
Office Action issued Sep. 28, 2021 in corresponding Japanese Patent Application No. 2020-507823 (with English Translation), 11 pages.

* cited by examiner

*Primary Examiner* — Jennifer A Steele
(74) *Attorney, Agent, or Firm* — Oblon, McClelland, Maier & Neustadt, L.L.P.

(57) ABSTRACT

Provided is a semi-aromatic polyamide fiber having excellent spinning stability, heat resistance and chemical resistance. The semi-aromatic polyamide fiber includes a semi-aromatic polyamide resin having a melting point of 290° C. or higher and a plasticizer having a 5% thermal weight reduction temperature of 320° C. or higher, the resin having as a dicarboxylic acid component an aromatic dicarboxylic acid unit and as a diamine component 1,9-nonanediamine unit and 2-methyl-1,8-octanediamine unit in a molar ratio (the former:the latter) of 70:30 to 99:1.

20 Claims, No Drawings

SEMI-AROMATIC POLYAMIDE FIBER AND METHOD FOR PRODUCING SAME

CROSS REFERENCE TO THE RELATED APPLICATION

This application is a continuation application, under 35 U.S.C. § 111(a), of international application No. PCT/JP2019/011367, filed Mar. 19, 2019, which claims priority to Japanese patent application No. 2018-056305 filed Mar. 23, 2018, the entire disclosures of which are herein incorporated by reference as a part of this application.

BACKGROUND OF THE INVENTION

The present invention relates to a semi-aromatic polyamide fiber and a method for producing the same.

Conventionally, fibers of nylon 6 or nylon 66 have been well-known as polyamide fibers, and have been used for various industrial material applications because of their high tenacity, toughness, and durability. These conventional polyamide fibers, however, have problems due to their insufficient heat resistance and chemical resistance, and poor dimensional stability caused by water absorption. In particular, heat resistance in use under high temperature as well as chemical resistance such as acid resistance has been required in applications such as automobile parts, electric/electronic parts, etc. In order to solve these problems, there have been proposed various semi-aromatic polyamide fibers having a terephthalic acid skeleton as a dicarboxylic acid unit.

For example, Patent Document 1 (JP Laid-open Patent Publication No. 9-13222) discloses a semi-aromatic polyamide fiber comprising a diamine unit having 9 carbon atoms as a melt-spinnable semi-aromatic polyamide. The semi-aromatic polyamide fiber is a polyamide fiber comprising dicarboxylic acid units containing terephthalic acid units in a proportion of 60 to 100 mol % based on the dicarboxylic acid units and diamine units containing 1,9-nonanediamine units and 2-methyl-1,8-octanediamine units in a total proportion of 60 to 100 mol % based on the diamine units, wherein a molar ratio of 1,9-nonanediamine unit relative to 2-methyl-1,8-octanediamine unit is 40:60 to 99:1. According to the description, the semi-aromatic polyamide fiber has high tenacity, high elastic modulus, and is excellent in properties such as heat resistance, chemical resistance, and water resistance. The semi-aromatic polyamide fiber can be applicable not only for battery materials, industrial materials such as reinforcing materials for rubber products, but also for clothing and carpets.

However, where a semi-aromatic polyamide is prepared to have a melting point of 290° C. or higher for the purpose of improving heat resistance during use at high temperatures, the spinning temperature during melt spinning is close to the decomposition temperature of the polyamide main chain, resulting in poor spinning stability due to facilitated resin deterioration. Moreover, high melting point of the resin requires spinning the resin in a high-viscosity state leading to particular difficulty in spinning fibers with small fineness.

RELATED DOCUMENT

Patent Document

[Patent Document 1] JP Laid-open Patent Publication No. 9-13222

SUMMARY OF THE INVENTION

The present invention solves the problems in the prior art as described above, and provides a semi-aromatic polyamide fiber having excellent spinning stability, heat resistance and chemical resistance.

An object of the present invention is to provide a semi-aromatic polyamide fiber obtained in improved spinning stability, having excellent heat resistance and chemical resistance which are unattainable by the conventional polyamide fibers. Further, another object of the present invention is to provide a production method to obtain the semi-aromatic polyamide fiber by spinning stably.

As a result of intensive studies to solve the above problems, the present inventors have found that (i) although higher proportion 1,9-nonanediamine units and lower proportion of 2-methyl-1,8-octanediamine units in the diamine components can effectively improve heat resistance of the semi-aromatic polyamide resin, such a semi-aromatic polyamide resin has difficulty in melt spinnability due to high heat resistance. Then the present inventors have further found that (ii) where a plasticizer having heat resistance is incorporated into a semi-aromatic polyamide resin excellent in heat resistance obtained by copolymerizing as the dicarboxylic acid component aromatic dicarboxylic acid units and as the diamine component mainly 1,9-nonanediamine units and a specific amount of 2-methyl-1,8-octanediamine units, followed by carry out melt-spinning, it is possible to lower spinning temperature of the high heat resistant semi-aromatic polyamide resin during melt-spinning; and that (iii) as a result, melt-spinnability of the semi-aromatic polyamide resin is significantly improved by suppressing heat deterioration during melt spinning so as to obtain semi-aromatic polyamide fibers with high heat resistance and chemical resistance due to suppression of heat deterioration. The inventors thus achieved the present invention.

That is, the present invention may include the following aspects.

Aspect 1

A semi-aromatic polyamide fiber comprising:

a semi-aromatic polyamide resin comprising as a dicarboxylic acid component an aromatic dicarboxylic acid unit and as a diamine component 1,9-nonanediamine unit and 2-methyl-1,8-octanediamine unit in a molar ratio (the former:the latter) of 70:30 to 99:1, and having a melting point of 290° C. or higher (preferably 295° C. or higher, more preferably 300° C. or higher); and a plasticizer having a 5% thermal weight reduction temperature of 320° C. or higher (preferably 330° C. or higher, and more preferably 340° C. or higher).

Aspect 2

The semi-aromatic polyamide fiber according to aspect 1, wherein the plasticizer comprises a carboxylic acid amide compound.

Aspect 3

The semi-aromatic polyamide fiber according to aspect 1 or 2, wherein the proportion of the plasticizer is 0.1 to 10% by weight (preferably 1 to 7% by weight, more preferably 1 to 5% by weight) based on the amount of semi-aromatic polyamide resin.

Aspect 4

The semi-aromatic polyamide fiber according to any one of aspects 1 to 3, having a single fiber fineness is 0.1 to 100 dtex (in particular, the single fiber fineness of the drawn fiber is 0.03 to 50 dtex, preferably 0.1 to 30 dtex, more preferably 0.1 to 15 dtex; the fineness of drawn yarn comprising fibers with small fineness is preferably 0.1 to 5 dtex, more preferably 0.1 to 1.5 dtex).

Aspect 5

The semi-aromatic polyamide fiber according to any one of aspects 1 to 4, wherein the CV value (N=20) of the fiber diameter is 3% or less (preferably 2% or less).

Aspect 6

A method for producing a semi-aromatic polyamide fiber, comprising:

melt-spinning a semi-aromatic polyamide resin comprising as a dicarboxylic acid component an aromatic dicarboxylic acid unit and as a diamine component 1,9-nonanediamine unit and 2-methyl-1,8-octanediamine unit in a molar ratio (1,9-nonanediamine unit:2-methyl-1,8-octanediamine unit) of 70:30 to 99:1, and having a melting point of 290° C. or higher (preferably 295° C. or higher, more preferably 300° C. or higher); in combination with a plasticizer having a 5% thermal weight reduction temperature of 320° C. or higher (preferably 330° C. or higher, and more preferably 340° C. or higher).

Aspect 7

The production method according to aspect 6, wherein spinning of the semi-aromatic polyamide resin is carried out at a spinning temperature of 300 to 350° C. (preferably 305 to 340° C., more preferably 310 to 330° C.).

Aspect 8

The production method according to aspect 6 or 7, wherein the plasticizer is combined with the semi-aromatic polyamide resin in a ratio of 0.1 to 10% by weight (preferably 1 to 7% by weight, more preferably 1 to 5% by weight) based on the semi-aromatic polyamide resin.

Aspect 9

The production method according to any one of aspects 6 to 8, wherein the semi-aromatic polyamide resin to which the plasticizer is added has a melting viscosity of 40 to 150 Pa·s (preferably 60 to 130 Pa s) in a melted condition at 310° C. and a shear rate of 1000 sec$^{-1}$.

Aspect 10

The production method according to any one of aspects 6 to 9, wherein the spinning temperature is in a range of Tw+5° C. or lower (preferably Tw or lower, more preferably Tw−5° C. or lower, still more preferably Tw−10° C. or lower) where Tw (° C.) means 5% thermal weight reduction temperature of the plasticizer.

The present invention also encompasses any combination of at least two constituent elements disclosed in claims and/or description. For examples, the present invention encompasses any combination of two or more elements described in claims.

Effect of the Invention

According to the present invention, although a semi-aromatic polyamide resin that requires melt spinning at high temperature is processed, it is possible to provide a semi-aromatic polyamide fiber having high heat resistance and excellent chemical resistance because the semi-aromatic polyamide resin has improved spinning stability during melt-spinning so as to suppress deterioration of the semi-aromatic polyamide resin. Further, it is possible to provide a semi-aromatic polyamide fiber having reduced unevenness in fiber diameter and small single fiber fineness due to excellent spinning stability.

DESCRIPTION OF THE EMBODIMENTS

Hereinafter, one embodiment of the present invention will be described in detail.

The semi-aromatic polyamide resin according to the present invention essentially comprises a dicarboxylic acid component derived from an aromatic dicarboxylic acid. Examples of the aromatic dicarboxylic acids may include terephthalic acid, isophthalic acid, 2,6-naphthalenedicarboxylic acid, 2,7-naphthalenedicarboxylic acid, 1,4-naphthalenedicarboxylic acid, 1,4-phenylenedioxydiacetic acid, 1,3-phenylenedioxydiacetic acid, diphenic acid, dibenzoic acid, 4,4'-oxydibenzoic acid, diphenylmethane-4,4'-dicarboxylic acid, diphenylsulfone-4,4'-dicarboxylic acid, 4,4'-biphenyldicarboxylic acid, and other aromatic dicarboxylic acids. The aromatic dicarboxylic acids may be used singly or in combination of two or more. Among them, terephthalic acid is preferred from the viewpoint of acid resistance and heat aging resistance. The proportion of dicarboxylic acid component derived from such an aromatic dicarboxylic acid is preferably 60 mol % or more, and more preferably 75 mol % or more based on the total dicarboxylic acid component. Examples of dicarboxylic acids other than the above aromatic dicarboxylic acids in the dicarboxylic acid component may include aliphatic dicarboxylic acids such as malonic acid, dimethylmalonic acid, succinic acid, 3,3-diethylsuccinic acid, glutaric acid, 2,2-dimethylglutaric acid, adipic acid, 2-methyladipic acid and trimethyl. adipic acid, pimelic acid, azelaic acid, sebacic acid and suberic acid; and alicyclic dicarboxylic acids such as 1,3-cyclopentanedicarboxylic acid and 1,4-cyclohexanedicarboxylic acid. These acids may be used singly or in combination of two or more. Among them, it is preferable that the dicarboxylic acid component is composed of 100% the component derived from aromatic dicarboxylic acid in view of fiber tenacity, chemical resistance, oxidation deterioration resistance, heat resistance and the like. Further, a polyvalent carboxylic acid such as trimellitic acid, trimesic acid and pyromellitic acid may be used in combination with the dicarboxylic acid components within a range that does not impair spinning stability.

In order for the semi-aromatic polyamide resin of the present invention to have a melting point of 290° C. or higher and to achieve excellent heat resistance, it is important that the diamine components comprise 1,9-nonandiamine units and 2-methyl-1,8-octanediamine units and that the molar ratio of the 1,9-nonanediamine unit to the 2-methyl-1,8-octanediamine unit is 70:30 to 99:1, and particularly preferably 80:20 to 90:10. Where the molar ratio of the 1,9-nonanediamine unit is less than 70 mol % and the molar ratio of the 2-methyl-1,8-octanediamine unit is more than 30 mol %, the obtained semi-aromatic polyamide resin has a low melting point of which is too low to achieve heat resistance.

As the diamine components other than 1,9-nonanediamine and 2-methyl-1,8-octanediamine, as long as the effects of the present invention are impaired, the diamine components derived from the following compound, and may include, for example, an aliphatic alkylenediamine having 6 to 12 carbon atoms, and examples of the aliphatic alkylenediamine may include aliphatic diamines such as 1,6-hexanediamine, 1,8-octanediamine, 1,10-decanediamine, 1,11-undecanediamine, 1,12-dodecanediamine, 2-methyl-1,5-pentanediamine, 3-methyl-1,5-pentanediamine, 2,2,4-trimethyl-1,6-hexanediamine, 2,4,4-trimethyl-1,6-hexanediamine, 5-methyl-1,9-nonanediamine, and others.

Diamines other than the above-mentioned aliphatic alkylenediamines, there may be mentioned aliphatic diamines such as ethylenediamine, propylenediamine, and 1,4-butanediamine; alicyclic diamines such as cyclohexanediamine, methylcyclohexanediamine, isophoronediamine, norbornanedimethyldiamine, and tricyclodecanedimethyldiamine; aromatic diamines such as p-phenylenediamine, m-phenylenediamine, xylylenediamine, xylenediamine, 4,4'-diaminodiphenylmethane, 4,4'-diaminodiphenylsulfone, 4,4'-diaminodiphenylether, and a mixture of two or more.

The semi-aromatic polyamide resin used in the present invention preferably has a [CONH/CH$_2$] ratio of 1/2 to 1/8, particularly 1/3 to 1/5 in its molecular chain. The polyamide resin having the [CONH/CH$_2$] ratio in this range is suitably used for a separator and the like, that requires to have particularly excellent heat resistance and chemical resistance.

The semi-aromatic polyamide resin preferably has an intrinsic viscosity (measured at 30° C. in concentrated sulfuric acid) of 0.7 to 2.0 dl/g, more preferably 0.8 to 2.0 dl/g, and particularly preferably 1.0 to 1.8 dl/g. A polyamide resin having an intrinsic viscosity within the above range is less likely to be decomposed as well as crosslinked in the polymer main chain, so that it is possible to obtain a polyamide fiber having excellent heat resistance and chemical resistance.

Furthermore, in the above-mentioned polyamide resin, terminal groups of its molecular chain may be preferably blocked with a terminal-blocking agent in a proportion of 10 mol % or more, more preferably 40 mol % or more, and particularly preferably 70 mol % or more. By making the terminal groups of the molecular chains blocked, decomposition of the polymer main chain and cross-linking reaction are less likely to occur. Further, the resulting fiber has excellent acid resistance and heat resistance. The terminal-blocking agent is not particularly limited to a specific one as long as the terminal-blocking agent is a monofunctional compound having reactivity with an amino group or a carboxyl group at the polyamide terminal. From the viewpoint of reactivity and stability of the blocked terminal, the preferable terminal blocking-agent may include monocarboxylic acids and monoamines, and monocarboxylic acid is more preferable in terms of handleability, reactivity, stability of the blocked end, cost, and the like. Examples of the monocarboxylic acids include acetic acid, propionic acid, butyric acid, valeric acid, caproic acid, caprylic acid, lauric acid, tridecylic acid, myristic acid, palmitic acid, stearic acid, and benzoic acid. The ratio of blocked terminals can be determined by $^1$H-NMR from the integral value of the characteristic signal corresponding to each terminal group.

The method for producing the above-mentioned polyamide resin is not particularly limited, and any known method for producing a crystalline polyamide resin can be used. For example, the production method may include a solution polymerization method or an interfacial polymerization method in each of which an acid chloride and a diamine are used as raw materials; a melt polymerization method in which a dicarboxylic acid or an alkyl ester of dicarboxylic acid and a diamine are used as raw materials; a solid phase polymerization method; and other methods.

As an example, a polyamide resin can be easily produced by obtaining a nylon salt in reaction of diamine component, dicarboxylic acid component, a terminal-blocking agent, and a catalyst together, and then polymerizing the nylon salt at a temperature of 280° C. or lower to give a prepolymer having an intrinsic viscosity of 0.15 to 0.30 dl/g, followed by subjecting the prepolymer to solid phase polymerization or polymerizing the prepolymer using a melt extruder. Where the polymerization is carried out by solid phase polymerization in the final stage, the solid phase polymerization is preferably carried out under reduced pressure or under inert gas flow. The polymerization temperature in the range of 200 to 250° C. achieves high polymerization rate, good productivity, and effective suppression of coloring and gelation. Where the polymerization is carried out using a melt extruder in the final stage of the polymerization, the preferable polymerization temperature is 370° C. or lower because the polyamide resin is hardly decomposed, resulting in capable of obtaining a polyamide resin with reduced deterioration. Examples of the polymerization catalyst may include phosphoric acid, phosphorous acid, hypophosphorous acid, or ammonium salts thereof, metal salts thereof, and esters thereof. Among them, preferable catalyst may include sodium hypophosphite because of easy availability and handleability.

Thus-obtained semi-aromatic polyamide resin is excellent not only in heat resistance but also in chemical resistance such as acid resistance. However, such a semi-aromatic polyamide resin has difficulty for producing fibers by melt spinning, because the spinning temperature of the semi-aromatic polyamide resin becomes close to the decomposition temperature of the polyamide main chain so that the decomposition reaction and the cross-linking reaction of the polymer main chain are likely to occur. Therefore, it is important to combine a highly heat-resistant semi-aromatic polyamide resin with a highly heat-resistant plasticizer (heat-resistant plasticizer) for melt spinning. Since the plasticizer itself has high heat resistance, the plasticizer can exhibit a plasticizing effect without being decomposed during melt spinning. As a result, since the melt viscosity of the semi-aromatic polyamide resin can be lowered during melt spinning at high temperature, even if the semi-aromatic polyamide resin with high heat resistance is used, melt spinning can be carried out at a temperature sufficiently lower than the decomposition temperature of the polyamide main chain, resulting in improvement in spinning stability. The plasticizer to be combined with the semi-aromatic polyamide resin of the present invention should have a 5% thermal weight reduction temperature of 320° C. or higher in the measuring method described later. The 5% thermal weight reduction temperature is more preferably 330° C. or higher, and further preferably 340° C. or higher. The upper limit is not particularly limited, but is preferably 400° C. or lower. Where the temperature is lower than 320'C, the plasticizer is thermally decomposed at the spinning temperature required for the highly heat-resistant semi-aromatic polyamide resin, and thus stable spinning cannot be performed.

The plasticizer is not particularly limited as long as it is heat resistant as described above, and examples of the plasticizer may include a plasticizer containing, as a major component, a carboxylic acid amide compound (aliphatic carboxylic acid amide compound, aromatic carboxylic acid amide compound), an aliphatic carboxylic acid, an ester of an aliphatic carboxylic acid and an alcohol, an oligomer having a fluorene skeleton, and others.

Among these plasticizers, the carboxylic acid amide compound is preferred as the major component, particularly in view of affinity with semi-aromatic polyamide resins. The major component means that a component accounts for at least half of the total amount of the plasticizer, and the content of the major component in the plasticizer is 50 to 99.9% by weight based on the total amount of the plasticizer.

Examples of the carboxylic acid amide compound include compounds obtained by a dehydration reaction of a higher aliphatic monocarboxylic acid or a polybasic acid with a diamine. The higher aliphatic monocarboxylic acid is preferably a saturated aliphatic monocarboxylic acid having 12 or more carbon atoms and a saturated aliphatic hydroxycarboxylic acid having 12 or more carbon atoms. Examples thereof may include palmitic acid, stearic acid, behenic acid, montanic acid, and 12-hydroxystearic acid. Examples of the polybasic acids may include aliphatic dicarboxylic acids such as malonic acid, succinic acid, adipic acid, sebacic acid, pimelic acid, and azelaic acid; aromatic dicarboxylic acids such as phthalic acid, and terephthalic acid; and alicyclic dicarboxylic acids such as cyclohexanedicarboxylic acid and cyclohexyl succinic acid; and others. Examples of diamines may include ethylenediamine, 1,3-diaminopropane, 1,4-diaminobutane, hexamethylenediamine, meta-xylenediamine, tolylenediamine, para-xylylenediamine, phenylenediamine, isophoronediamine and others.

As the preferable carboxylic acid amide compounds, there may be mentioned a compound obtained by polycondensing stearic acid, sebacic acid, and ethylenediamine, and more preferably a compound obtained by polycondensing stearic acid, sebacic acid, and ethylenediamine at a molar ratio of 2:1:2. Further, preferable carboxylic acid amide compounds may include bisamide compounds such as N,N'-methylenebisstearic acid amide or N,N'-ethylenebisstearic acid amide obtained by reacting a diamine with an aliphatic carboxylic acid; dicarboxylic acid amide compounds such as N,N'-dioctadecyl terephthalic acid amide.

Examples of the carboxylic acids may include saturated or unsaturated aliphatic monovalent, divalent, or trivalent carboxylic acid. Here, the carboxylic acid also includes an alicyclic carboxylic acid. Among them, preferred aliphatic carboxylic acids are divalent carboxylic acids having 2 to 36 carbon atoms. Specific examples of such aliphatic carboxylic acids may include oxalic acid, malonic acid, succinic acid, glutaric acid, adipic acid, palmitic acid, stearic acid, caproic acid, capric acid, lauric acid, arachidic acid, behenic acid, lignoceric acid, cerotic acid, melissic acid, tetrariacontanoic acid, montanic acid, adipic acid, azelaic acid and the like.

As the aliphatic carboxylic acid used for the above-mentioned ester of aliphatic carboxylic acid and alcohol, there may be mentioned, for example, aliphatic carboxylic acids which are the same one as the above-described aliphatic carboxylic acid. On the other hand, examples of the alcohol may include saturated or unsaturated monohydric or polyhydric alcohols. These alcohols may have a substituent such as a fluorine atom or an aryl group. Among these, the alcohols are preferably monohydric or polyhydric saturated alcohols having 30 or less carbon atoms, and more preferably aliphatic or alicyclic saturated monohydric or polyhydric alcohols having 30 or less carbon atoms.

Specific examples of such alcohols may include octanol, decanol, dodecanol, stearyl alcohol, behenyl alcohol, ethylene glycol, diethylene glycol, glycerin, pentaerythritol, 2,2-dihydroxyperfluoropropanol, neopentylene glycol, ditrimethylolpropane, dipentaerythritol, and the like.

The plasticizer preferably contains an antioxidant in order to improve heat resistance at a molding temperature. The antioxidant enhances thermal stability of the amide component, and examples thereof may include a phenol-based antioxidant, a phosphite-based antioxidant, and a sulfur-based antioxidant. The content of the above antioxidant is preferably 0.1 to 20% by weight based on the total amount of the plasticizer.

The proportion of the plasticizer is preferably 0.1 to 10% by weight, more preferably 1 to 7% by weight, still more preferably 1 to 5% by weight, based on the semi-aromatic polyamide resin. Where the proportion of the plasticizer based on the semi-aromatic polyamide resin is too low, the melt viscosity of the semi-aromatic polyamide may be hardly decreased, leading to insufficient improvement in spinning stability. On the other hand, where the proportion of the plasticizer based on the semi-aromatic polyamide resin is too high, the melt viscosity of the semi-aromatic polyamide may be too low to realize spinning stability.

If necessary, the semi-aromatic polyamide fiber of the present invention may contain additives such as a stabilizer, a colorant, an ultraviolet absorber, a light stabilizer, an antioxidant, an antistatic agent, an anti-aging agent, a flame retardant, a lubricant, a retarder of crystallization rate, and the like, as long as the effects of the present invention is not spoiled.

The semi-aromatic polyamide fiber of the present invention may preferably have a single fiber fineness of 0.1 to 100 dtex, more preferably 0.1 to 30 dtex, and even more preferably 0.1 to 20 dtex. This single fiber fineness may be a single fiber fineness in the undrawn state before drawing. In particular, in the case of obtaining drawn fibers having a small single fiber fineness, the undrawn semi-aromatic polyamide fiber may have a single fiber fineness of preferably 0.1 to 5 dtex, and more preferably 0.1 to 3 dtex. The single fiber fineness of the drawn fiber is preferably 0.03 to 50 dtex, more preferably 0.1 to 30 dtex, and further preferably 0.1 to 15 dtex. A drawn yarn (multifilament) comprising fibers with small fineness has a single fiber fineness of preferably 0.1 to 5 dtex, more preferably 0.1 to 1.5 dtex.

It is preferable that undrawn fiber has a small single fiber fineness to obtain a drawn yarn having a small single fiber fineness from the undrawn fiber. In particular, where a fiber having a single fiber fineness of 3 dtex or smaller is required as undrawn fiber, a further lower melt viscosity is necessary for spinning stability. However, if the spinning temperature is increased to reduce melt viscosity, as described above, the spinning temperature becomes close to the decomposition temperature of the polyamide main chain that may facilitate deterioration of the resin, resulting in rather deteriorated spinning stability. According to the present invention, by combining the plasticizer of the present invention with the semi-aromatic polyamide resin, the melt viscosity of the semi-aromatic polyamide resin during melt spinning can be reduced. As a result, even using a spinneret having a small hole diameter, spinning can be stably carried out to obtain a semi-aromatic polyamide fiber having a single fiber fineness of 3 dtex or less in the undrawn state.

Since the semi-aromatic polyamide fiber of the present invention is produced with excellent spinning stability, it is possible to reduce unevenness in fiber diameter. The fiber diameter unevenness may be, as a CV value (%) of fiber diameter, for example, 3% or less, and preferably 2% or less.

In the present specification, the CV value (%) of fiber diameter is a value obtained as follows: first a fiber diameter is determined from a diameter of a circumscribed perfect circle of a fiber cut surface that is obtained as a cross section of a single fiber perpendicular to the fiber axis direction; second an average value and a standard deviation are obtained by measuring thus-determined fiber diameters in the repetition of N=20; third a CV value is obtained by dividing the standard deviation by the average value.

In the present invention, the semi-aromatic polyamide fiber may be either a non-conjugate fiber or a conjugate fiber (for example, split conjugate fiber) composed of a semi-aromatic polyamide resin and a thermoplastic resin other than the semi-aromatic polyamide resin. Where the split conjugation is performed, the species of the thermoplastic resin is not particularly limited to a specific one because mechanical stress such as shearing force is applied to split and subdivide the split conjugate fiber. Preferred examples of the thermoplastic resin may include a polyester resin, a polyamide resin, a polyolefin resin, a polyphenylene sulfide resin, a fluororesin and the like. In particular, by using a polyethylene terephthalate, an aromatic polyester, a polymethylpentene, or a polyphenylene sulfide as the thermoplastic resin, it is possible to obtain a semi-aromatic polyamide fiber having a small single fiber fineness and excellent in chemical resistance and heat resistance.

It is important that the semi-aromatic polyamide fiber of the present invention has a melting point of 290° C. or higher, more preferably 295° C. or higher, and still more preferably 300° C. or higher. The upper limit of the melting point is not particularly limited, but is usually about 340° C. The melting point of lower than 290° C. is insufficient to attain heat resistance, thus is not preferable. The semi-aromatic polyamide fiber of the present invention preferably has a glass transition temperature preferably in a range from 100 to 220° C., more preferably from 110 to 190° C., and still more preferably from 110 to 170° C. Too low glass transition temperature will decrease heat resistance, while too high glass transition temperature will cause undesirable difficulty in thermoforming of the obtained fibers.

The semi-aromatic polyamide fiber of the present invention preferably has a tenacity of 0.7 cN/dtex or greater, more preferably 0.8 cN/dtex or greater, still more preferably 1 cN/dtex or greater, further preferably 2.5 cN/dtex or greater, particularly preferably 3.5 cN/dtex or greater at room temperature. Although there is no particular upper limit, the tenacity may be 8.5 cN/dtex or lower.

The semi-aromatic polyamide fiber of the present invention preferably has an elastic modulus of 10 cN/dtex or greater, more preferably 15 cN/dtex or greater, still more preferably 25 cN/dtex or greater, and particularly preferably 28 cN/dtex or greater at room temperature. Although there is no particular upper limit, the elastic modulus may be 100 cN/dtex or lower.

The semi-aromatic polyamide fiber of the present invention preferably has a shrinkage rate (dimensional change rate under dry heat) of 30% or less, more preferably 20% or less, still more preferably 15% or less measured under a dry heat condition at 260° C. for 30 minutes. Where the shrinkage rate exceeds 30%, the fiber may have insufficient shape retention at high temperature. Here, the dimensional change rate under dry heat is a value measured by a method described in Examples described later.

The semi-aromatic polyamide fiber of the present invention preferably has a tenacity retention rate of 80% or greater and more preferably 90% or greater after being immersed in an acidic solution or an alkaline solution for a predetermined time. Here, the tenacity retention rate is a value measured by the method described in Examples described later.

The method for producing the semi-aromatic polyamide fiber of the present invention will be described below.

The method for producing semi-aromatic polyamide fiber comprises spinning a semi-aromatic polyamide resin having a melting point of 290° C. or higher, the semi-aromatic polyamide resin comprising as the dicarboxylic acid component an aromatic dicarboxylic acid unit and as the diamine component 1,9-nonanediamine unit and 2-methyl-1,8-octanediamine unit in a molar ratio of 1,9-nonanediamine unit to 2-methyl-1,8-octanediamine unit of 70:30 to 99:1, in combination with a plasticizer having a 5 wt % thermal weight loss temperature of 320° C. or higher.

The semi-aromatic polyamide resin is usually melt-spun using a melt extruder and then drawn if necessary. It is preferable to use a screw type extruder as the melt extruder. In the melt spinning step, for example, the semi-aromatic polyamide resin is melted at a spinning temperature of not lower than a melting point of the semi-aromatic polyamide resin and not higher than 350° C. (preferably not higher than 340° C.) in a melt retention time of 30 minutes or less and is discharged from a spinneret to obtain as-spun fibers (undrawn fibers) by fiberizing. In the melt spinning step, the semi-aromatic polyamide resin and the plasticizer may be melt-mixed in a melt extruder. Alternatively, a part of the semi-aromatic polyamide resin containing the plasticizer is used as a masterbatch and then the masterbatch is melt-mixed with the remaining semi-aromatic polyamide in a melt extruder.

The spinning temperature and melt retention time during spinning may be in the above range at which the semi-aromatic polyamide resin and plasticizer can be spun without thermal decomposition. Alternatively, the spinning temperature and melt retention time may be appropriately set depending on the type of semi-aromatic polyamide resin or plasticizer. For example, where the 5% thermal weight reduction temperature of the plasticizer is defined as Tw° C., the spinning temperature may be Tw+5° C. or lower, preferably Tw or lower, more preferably Tw−° C. or lower, and further preferably Tw−10° C. or lower.

More specifically, the spinning temperature may be preferably 300° C. or higher, more preferably 300 to 350° C., further preferably 305 to 340° C., and particularly preferably 310 to 330° C. Where the spinning temperature is lower than 300° C., the spinning temperature may be close to the melting point of the semi-aromatic polyamide resin so as to make the melt viscosity of the resultant high, resulting in deterioration in spinning stability. Where the spinning temperature is higher than 350° C., the spinning temperature may reach to the decomposition temperature range of the semi-aromatic polyamide main chain, that may cause thermal deterioration.

Without being combined with the plasticizer, the semi-aromatic polyamide resin has a melt viscosity in a range from 2,000 to 4,000 Pa·s at 310° C. and a shear rate of 1,000 sec$^{-1}$ so that it is difficult to spin fine fibers from the semi-aromatic polyamide resin having a melt viscosity in the above range. Further, the high melt viscosity causes a high shear stress at the time of discharging the resin leading to molecular orientation and crystallization of the as-spun fibers. Accordingly, drawing property of such as-spun fibers cannot be achieved so that tenacity of drawn fibers from the as-spun fibers tends to be low. By adding a plasticizer to the semi-aromatic polyamide and setting an apparent melt viscosity of the mixture to 40 to 150 Pa·s at 310° C. and a shear rate of 1000 sec$^{-1}$, spinnability can be improved thanks to the reduced melt viscosity during melt spinning so that thus spun fibers have reduced unevenness of fiber diameter at the time of spinning. As a result, for example, spinning can be stably performed even with a spinneret having a small hole diameter. The semi-aromatic polyamide mixture more preferably has a melt viscosity of 60 to 130 Pa·s.

As the plasticizer, there may be preferably mentioned a plasticizer having a viscosity-reducing effect in the below-mentioned range with respect to the semi-aromatic polyamide resin having a melt viscosity in the below-mentioned range. That is, as a viscosity reducing effect represented by the following formula of the plasticizer on plain polymer, the plasticizer preferably has a viscosity reducing effect to reduce a melt viscosity from the plain polymer by 70 to 200 Pa·s, and more preferably by 100 to 200 Pa·s at 310° C. and a shear rate of 1000 sec$^{-1}$. Here, the viscosity reducing effect of the plasticizer is represented by the following formula.

viscosity-reducing effect (Pa·s)=(melt viscosity of semi-aromatic polyamide resin without plasticizer (Pa·s))−(melt viscosity of semi-aromatic polyamide resin with plasticizer (Pa·s))

The filament fibers (as-spun fibers) spun in the melt-spinning process are, for example, taken up by a take-up roller or the like. At this time, if necessary, a heating or heat-retaining zone may be provided immediately below the nozzle; a cooling zone such as a blowing chamber may be provided; and/or an oil agent may be applied to the spun fibers. These fibers can be used as undrawn fibers. Further, the undrawn fibers may be drawn to obtain drawn fibers. Drawing is preferably carried out at a temperature of 270° C. or lower, and more preferably at a temperature in a range from 120 to 240° C., using a heating bath, hot steam spraying, a roller heater, a contact plate heater, a non-contact plate heater or the like. Further, the draw ratio is preferably 2 times or more, more preferably 3 times or more. The upper limit of the draw ratio is not particularly limited, and may be, for example, about 10 times. Too high temperature upon drawing may cause deterioration of the semi-aromatic polyamide resin, as well as reorganization of crystals, resulting in reduced fiber tenacity. If necessary, subsequent to drawing, heat treatment such as a constant length heat treatment, a tension heat treatment or a relaxation heat treatment can be further performed at 120 to 280° C. In addition to the above-mentioned method, production process of the fibers may also include direct spinning and drawing in which the obtained fiber can be directly used as a drawn fiber.

Thus-obtained semi-aromatic polyamide fiber can be suitably applicable to, by making use of its characteristics in a fiber form, for example, fiber materials for fiber-reinforced plastic (FRP), fiber-reinforced cement (FRC), and fiber-reinforced rubber (FRR), tire cords, screen gauzes, and air bags, and others. Further, as a form of non-woven fabric, the semi-aromatic polyamide fiber can be suitably applicable to alkaline battery structural products such as separators for alkaline batteries, liquid filters, air filters, geotextiles, canvases for papermaking, and the like. For use as a separator for alkaline batteries, the non-woven fabric preferable contains the semi-aromatic polyamide fiber in a proportion of 50 wt % or more, particularly 70 wt % or more in order to achieve excellent electrolyte retainability.

As the fibers constituting the separator, there may be mentioned fibers other than the above-mentioned semi-aromatic polyamide fibers, for example, fibers of general-purpose aliphatic polyamides such as nylon 6 and nylon 66; fibers of polyolefin resins such as ethylene-vinyl alcohol copolymer, polypropylene, polyethylene, polybutene, polymethylpentene, ethylene-propylene copolymer, ethylene-butene copolymer, in the form of plain fiber or conjugated form consisting of two kinds; cellulosic fibers obtained by mercerizing natural cellulose fibers; mercerized pulp; and others. Use of fibers having a lower melting point than the above-mentioned semi-aromatic polyamide fibers, known heat-fusible binder fibers, sizing agents and the like makes it possible to improve morphological stability of the non-woven fabric.

The non-woven fabric made of the above-mentioned semi-aromatic polyamide fibers can be obtained by any method for producing same. As an example, a non-woven fabric can be obtained by forming a fibrous web (a pre-entangled or pre-bonded non-woven fabric material), and allowing fibers in the fibrous web to be bonded or entangled to form a non-woven fabric. The obtained nonwoven fabric may be used as it is, or may be used as a laminate or overlaid product of a plurality of sheets. Examples of the method for forming the fibrous web may include a dry method such as a card method and an air lay method, and a wet method such as a papermaking method. There may be also mentioned a spunbond method, a meltblown method, and others. Among them, the fibrous web obtained by the wet method or meltblown method is preferable because the fibrous web is dense, has a uniform surface state. Preferred method for forming a fibrous web may include wet method and melt-blown method because such a fibrous web that is used as a battery separator can suppress metal deposition as well as movement of electrode active material. Further, the fibrous webs formed by each of the above methods may be combined and laminated for use.

EXAMPLES

Hereinafter, the present invention will be described in detail with reference to Examples, but the present invention is not limited to these Examples. The measured values in the examples are values measured by the following method.

(1) Glass Transition Temperature and Melting Point (° C.)

The glass transition temperature and melting point of the resin were determined using "TA3000-DSC" manufactured by Mettler-Tolodo International Inc. by heating a sample up to 400° C. at a heating rate of 10° C./min. under nitrogen atmosphere. The glass transition temperature was determined as an inflection point of the obtained DSC chart, and the melting point was determined as an exothermic peak temperature.

(2) 5% Thermogravimetric Reduction Temperature (° C.)

The 5% thermogravimetric reduction temperature of a plasticizer was measured using "Themoplus TG8120" manufactured by Rigaku Co., Ltd. by heating 10 mg of a plasticizer introduced to an aluminum pan at a temperature rising rate of 10° C./min. under nitrogen atmosphere and determining a temperature at which the plasticizer had a weight decreased by 5% from the initial weight (10 mg).

(3) Melt Viscosity (Pa·s)

The melt viscosity of the resin or resin mixture was measured using Capilograph "1C PMD-C" manufactured by Toyo Seiki Seisaku-sho, Ltd. at 310° C. and a shear rate of 1000 sec$^{-1}$.

(4) Spinnability

Spinnability was evaluated in accordance with the following criteria.

A: No breakage had occurred during continuous spinning for 24 hours.

B: Breakage had occurred at one time to less than three times during continuous spinning for 24 hours.

C: Breakage had occurred at three times or more during continuous spinning for 24 hours.

(5) Fineness (Dtex), Fiber Diameter Unevenness: CV Value (%)

The fineness was measured in accordance with JIS L 1013. The fiber diameter unevenness was determined by observing a cut surface of a multifilament at a cross section in a direction perpendicular to the fiber axis of the multi-filament, measuring fiber diameters of arbitrary 20 filaments, and calculating an average value and a standard deviation from the measured values (N=20). The CV value (%) was calculated as the value obtained by dividing the standard deviation by the average value. Here, the fiber diameter means a diameter of a perfect circle circumscribing the cut surface of a fiber.

(6) Tenacity and Elastic Modulus (cN/Dtex)

Tenacity and elastic modulus were measured in accordance with JIS L1013.

(7) Dimensional Change Rate Under Dry Heat (%)

The dimensional change rate under dry heat was measured in accordance with JIS L1013 at 180° C. as well as 260° C.

(8) Acid Resistance

Fiber sample (5 g) was put in 200 cc of an acidic aqueous solution consisting of sulfuric acid having a concentration of $3.0 \times 10^{-5}$ mol/L so as to be subjected to acidic condition at 70° C. for 100 hours, and the tenacity retention rate was calculated as a ratio of before and after the acid exposure, i.e., (tenacity after exposure)/(tenacity before exposure)×100.

(9) Alkali Resistance

Fiber sample (5 g) was put in 200 cc of an alkaline aqueous solution consisting of sodium hydroxide having a concentration of $1.5 \times 10^{-4}$ mol/L so as to be subjected to alkaline condition at 70° C. for 60 hours, and the tenacity retention rate was calculated as a ratio of before and after the alkaline exposure, i.e., (tenacity after exposure)/(tenacity before exposure)×100.

Example 1

Into an autoclave having an internal volume of 20 liters, were added 19.5 mol of terephthalic acid, 16 mol of 1,9-nonanediamine, 4 mol of 2-methyl-1,8-octanediamine, 1 mol of benzoic acid, sodium hypophosphite monohydrate (0.1 wt % based on the raw material) and 2.2 liters of distilled water, and then the atmosphere was replaced with nitrogen. Thereafter, the mixture was stirred at 100° C. for 30 minutes, followed by raising the internal temperature to 210° C. over 2 hours wherein the pressure in the autoclave was raised to 22 kg/cm$^2$ to allow the mixture to be reacted. After carrying out the reaction for 1 hour with keeping the condition, the temperature was then raised to 230° C. With keeping the temperature at 230° C. for 2 hours, the reaction was continued while gradually releasing steam to maintain the pressure at 22 kg/cm$^2$. Next, the pressure was reduced to 10 kg/cm$^2$ over 30 minutes, and the reaction was further continued for 1 hour so as to obtain a prepolymer. The prepolymer was dried at 100° C. under reduced pressure for 12 hours and pulverized to a size of 2 mm or smaller. The pulverized prepolymer was further subjected to solid phase polymerization at 230° C. and 0.1 mmHg for 10 hours to obtain a polymer (semi-aromatic polyamide resin).

Thus-obtained polymer was melt-extruded using a biaxial melt-extruder with adding 2% of a plasticizer having a 5% thermal weight reduction temperature of 348° C. and containing ethylenebisstearic acid amide as a major component and a phosphite antioxidant as an antioxidant. The melt viscosity (310° C., shear rate 1000 sec$^{-1}$) of the resin mixture was 125 Pa·s. The resin mixture was discharged at a spinning temperature of 320° C. from a round hole type nozzle with 100 holes each having a hole diameter of 0.15 mm, the discharged fibers were wound at a winding speed of 1000 m/min. in a discharged condition with a ratio (draft) of the discharge speed relative to the winding speed of 92. Thus-obtained as-spun fibers have a single fiber fineness of 2.2 dtex. Then, the as-spun fibers were drawn at a draw ratio of 3.14 at 160° C. under dry heat in one furnace, and then subjected to heat treatment at 220° C. to obtain a drawn multifilaments of 70 dtex/100 filaments. Evaluation results of thus-obtained drawn multifilaments are shown in Table 1. The fiber diameter unevenness (CV value) of the drawn fibers was 1.0%.

Example 2

Production process of fibers was performed in the same manner as in Example 1 except for discharging from a round hole type nozzle with 24 holes each having a hole diameter of 0.25 mm at a spinning temperature of 310° C. The single fiber fineness of the obtained as-spun fibers was 15 dtex. Then, the as-spun fibers were drawn at a draw ratio of 3.75 at 160° C. under dry heat in one furnace, and then subjected to heat treatment at 220° C. to obtain a drawn multifilaments of 96 dtex/24 filaments. Evaluation results of thus-obtained drawn multifilaments are shown in Table 1. The fiber diameter unevenness (CV value) of the drawn fibers was 1.1%.

Example 3

Production process of fibers was performed in the same manner as in Example 1 except for discharging from a round hole type nozzle with 3 holes each having a hole diameter of 0.4 mm at a spinning temperature of 310° C. The single fiber fineness of the obtained as-spun fibers was 100 dtex. Then, the as-spun fibers were drawn at a draw ratio of 3.33 at 160° C. under dry heat in one furnace, and then subjected to heat treatment at 220° C. to obtain a drawn multifilaments of 90 dtex/3 filaments. Evaluation results of thus-obtained drawn multifilaments are shown in Table 1.

Example 4

Production process of fibers was performed in the same manner as in Example 1 except for adding 4% of the plasticizer. The single fiber fineness of the obtained as-spun fibers was 2.2 dtex. Then, the as-spun fibers were drawn at a draw ratio of 3.14 at 160° C. under dry heat in one furnace, and then subjected to heat treatment at 220° C. to obtain a drawn multifilaments of 70 dtex/100 filaments. Evaluation results of thus-obtained drawn multifilaments are shown in Table 1.

Example 5

Production process of fibers was performed in the same manner as in Example 1 except for adding 7% of the plasticizer. The single fiber fineness of the obtained as-spun fibers was 2.2 dtex. Then, the as-spun fibers were drawn at a draw ratio of 3.14 at 160° C. under dry heat in one furnace, and then subjected to heat treatment at 220° C. to obtain a drawn multifilaments of 70 dtex/100 filaments. Evaluation results of thus-obtained drawn multifilaments are shown in Table 1.

Example 6

Production process of fibers was performed in the same manner as in Example 1 except for adding 5% of a plasticizer having a 5% thermal weight reduction temperature of 339° C. and containing a fluorene oligomer as a major component and a phosphite antioxidant as an antioxidant, and discharging at a spinning temperature of 330° C. The single fiber fineness of the obtained as-spun fibers was 2.2 dtex. Then, the as-spun fibers were drawn at a draw ratio of 2.2 at 160° C. under dry heat in one furnace, and then subjected to heat treatment at 220° C. to obtain a drawn multifilaments of 100 dtex/100 filaments. Evaluation results of thus-obtained drawn multifilaments are shown in Table 1.

Example 7

Production process of fibers was performed in the same manner as in Example 1 except for adding 2% of a plasticizer having a 5% thermal weight reduction temperature of 320° C. and containing ethylene bisstearic acid amide as a major component and a phosphite antioxidant as an antioxidant. The single fiber fineness of the obtained as-spun fibers was 2.2 dtex. Then, the as-spun fibers were drawn at a draw ratio of 2.2 at 160° C. under dry heat in one furnace, and then subjected to heat treatment at 220° C. to obtain a drawn multifilaments of 100 dtex/100 filaments. Evaluation results of thus-obtained drawn multifilaments are shown in Table 1.

Example 8

A semi-aromatic polyamide polymer was obtained in the same manner as in Example 1 except that 17 mol of 1,9-nonanediamine and 3 mol of 2-methyl-1,8-octanediamine were used as the diamine raw material. Further, production process of fibers was performed in the same manner as in Example 2 except for adding 4% of the plasticizer and spinning at a spinning temperature of 325° C. The single fiber fineness of the obtained as-spun fibers was 15 dtex. Then, the as-spun fibers were drawn at a draw ratio of 3.75 at 160° C. under dry heat in one furnace, and then subjected to heat treatment at 220° C. to obtain a drawn multifilaments of 96 dtex/24 filaments. Evaluation results of thus-obtained drawn multifilaments are shown in Table 1.

Comparative Example 1

Production process of fibers was performed in the same manner as in Example 2 except that the plasticizer was not added and that the spinning temperature was 350° C. The single fiber fineness of the obtained as-spun fibers was 15 dtex. Then, the as-spun fibers were drawn at a draw ratio of 2.5 at 160° C. under dry heat in one furnace, and then subjected to heat treatment at 220° C. to obtain a drawn multifilaments of 144 dtex/24 filaments. Evaluation results of thus-obtained drawn multifilaments are shown in Table 1. The fiber diameter unevenness (CV value) of the drawn fibers was 5.2%.

Comparative Example 2

Production process of fibers was performed in the same manner as in Example 1 except for adding 2% of a plasticizer having a 5% thermogravimetric reduction temperature of 295° C. and containing hydroxybenzoic acid amide. The single fiber fineness of the obtained as-spun fibers was 2.2 dtex. Then, the as-spun fibers were drawn at a draw ratio of 2.2 at 160° C. under dry heat in one furnace, and then subjected to heat treatment at 220° C. to obtain a drawn multifilaments of 100 dtex/100 filaments. Evaluation results of thus-obtained drawn multifilaments are shown in Table 1.

Comparative Example 3

A semi-aromatic polyamide polymer was obtained in the same manner as in Example 1 except that 10 mol of 1,9-nonanediamine and 10 mol of 2-methyl-1,8-octanediamine were used as the diamine raw material. Further, production process of fibers was performed in the same manner as in Example 1 except that the plasticizer was not added and that the spinning temperature was 290° C. The single fiber fineness of the obtained as-spun fibers was 2.2 dtex. Then, the as-spun fibers were drawn at a draw ratio of 3.14 at 160° C. under dry heat in one furnace, and then subjected to heat treatment at 220° C. to obtain a drawn multifilaments of 70 dtex/100 filaments. Evaluation results of thus-obtained drawn multifilaments are shown in Table 1.

TABLE 1

|  | Ex. 1 | Ex. 2 | Ex. 3 | Ex. 4 | Ex. 5 | Ex. 6 | Ex. 7 | Ex. 8 | Com. Ex. 1 | Com. Ex. 2 | Com. Ex. 3 |
| --- | --- | --- | --- | --- | --- | --- | --- | --- | --- | --- | --- |
| Resin |  |  |  |  |  |  |  |  |  |  |  |
| Unit Ratio (1,9-nonandiamine/ 2-methyl-1,8-octanediamine) | 80/20 | 80/20 | 80/20 | 80/20 | 80/20 | 80/20 | 80/20 | 85/15 | 80/20 | 80/20 | 50/50 |
| Melting point (° C.) | 300 | 300 | 300 | 300 | 300 | 300 | 300 | 305 | 300 | 300 | 265 |
| Glass transition temp. (° C.) | 120 | 120 | 120 | 120 | 120 | 120 | 120 | 120 | 120 | 120 | 120 |
| Plasticizer |  |  |  |  |  |  |  |  |  |  |  |
| Major component | EBS* | EBS | EBS | EBS | EBS | Fluorene oligomer | EBS | EBS | — | HBAA** | — |
| 5% Thermal weight reduction temp. (° C.) | 348 | 348 | 348 | 348 | 348 | 339 | 320 | 348 | — | 295 | — |
| Added proportion based on resin (wt %) | 2 | 2 | 2 | 4 | 7 | 5 | 2 | 4 | 0 | 2 | 0 |
| Viscosity |  |  |  |  |  |  |  |  |  |  |  |
| Melt viscosity (Pa · s) | 125 | 125 | 125 | 72 | 32 | 75 | 65 | 125 | 245 | 100 | 30 |
| Spinning |  |  |  |  |  |  |  |  |  |  |  |
| Spinning temp. (° C.) | 320 | 310 | 310 | 320 | 320 | 330 | 320 | 325 | 350 | 320 | 290 |
| Spinnability | A | A | A | A | B | B | B | A | C | C | A |
| Fiber property |  |  |  |  |  |  |  |  |  |  |  |
| Single fiber fineness (dtex) | 0.7 | 4.0 | 30 | 0.7 | 0.7 | 1.0 | 1.0 | 4.0 | 6 | 1 | 0.7 |
| Tenacity (cN/dtex) | 4.5 | 4.16 | 3.5 | 4.5 | 4.5 | 2.0 | 2.0 | 4.4 | 1.5 | 1.6 | 4.2 |
| Elastic modulus (cN/dtex) | 44 | 33.6 | 30 | 44 | 44 | 20 | 20 | 44 | 30 | 18 | 43.2 |
| Dimensional change rate under dry heat |  |  |  |  |  |  |  |  |  |  |  |
| 180° C. for 30 min. (%) | 6.0 | 4.0 | 4.0 | 5.9 | 6.0 | 14.5 | 15 | 4.0 | 15 | 18 | 8.3 |
| 260° C. for 30 min. (%) | 12.0 | 9.6 | 10.0 | 11.6 | 13.0 | 24 | 24 | 10 | 25 | 28 | UD* |

TABLE 1-continued

|  | Ex. 1 | Ex. 2 | Ex. 3 | Ex. 4 | Ex. 5 | Ex. 6 | Ex. 7 | Ex. 8 | Com. Ex. 1 | Com. Ex. 2 | Com. Ex. 3 |
|---|---|---|---|---|---|---|---|---|---|---|---|
| Acid resistance 70° C. for 100 hr. (%) | 100 | 100 | 100 | 100 | 100 | 100 | 100 | 100 | — | — | 98 |
| Alkali resistance 70° C. for 100 hr. (%) | 97 | 97 | 97 | 97 | 97 | 95 | 95 | — | — | — | 95 |

*EBS: Ethylenebisstearic acid amide,
**HBAA: Hydroxybenzoic acid amide
*UD: Undetectable In Examples 1 to 8, are obtained drawn fibers having a single fiber fineness after drawing of 0.7 to 30 dtex because of improved spinning stability that is achieved by adding plasticizers, each having a 5% thermal weight reduction temperature of 320° C. or higher, to semi-aromatic polyamide resins, each containing 1,9-nonanediamine units and 2-methyl-1,8-octanediamine units at a molar ratio of 1,9-nonanediamine units to 2-methyl-1,8-octanediamine units of 80:20 to 85:15, respectively.

On the other hand, Comparative Example 1 in which no plasticizer was added had caused fiber breakage due to deteriorated spinning stability because the spinning temperature was close to the decomposition temperature of the polyamide main chain. In addition, the fiber diameter unevenness was larger than that in Example 2. Furthermore, the high melt viscosity causes a high shear stress at the time of discharging the resin so that orientation and crystallization were occurred in the as-spun fibers. Therefore, although as-spun fibers were obtained, thus-obtained fibers could not be drawn as high draw ratio as that in Example 2. As a result, the tenacity of the drawn fibers of Comparative Example 1 was smaller than that of the drawn fibers of Example 2 even though melt spinning was performed using the same round hole nozzle with 24 holes each having a diameter of 0.25 mm as in Example 2. In Comparative Example 2, where the plasticizer having a 5% thermal weight reduction temperature of lower than 320° C. is used, the plasticizer was damaged by thermal decomposition at the spinning temperature, resulting in fiber breakage and deteriorated spinning stability. In Comparative Example 3, was used the semi-aromatic polyamide resin containing 1,9-nonanediamine unit and 2-methyl-1,8-octanediamine unit at a molar ratio of 1,9-nonanediamine unit to 2-methyl-1,8-octanediamine unit of 50:50. The obtained fiber had high dimensional change rate under dry heat and low heat resistance.

Although the preferred embodiments of the present invention have been described above, those skilled in the art would easily conceive various changes and modifications within the obvious scope by viewing the present specification. Therefore, such changes and modifications are construed as being within the scope of the invention defined by the claims.

What is claimed is:

1. A semi-aromatic polyamide fiber, comprising:
a semi-aromatic polyamide resin comprising as (i) a dicarboxylic acid component, an aromatic dicarboxylic acid unit in at least 60 mol. %, relative to the dicarboxylic acid component, and as (ii) a diamine component, (ii-a) 1,9-nonanediamine unit and (ii-b) 2-methyl-1,8-octanediamine unit in a (ii-a)/(ii-b) molar ratio in a range of from 70:30 to 99:1; and
a plasticizer having a 5% thermal weight reduction temperature of 320° C. or higher,
wherein the semi-aromatic polyamide resin has a melting point of 290° C. or higher, and
wherein the plasticizer comprises at least one selected from a group consisting of a carboxylic acid amide compound and an oligomer having a fluorene skeleton.

2. The semi-aromatic polyamide fiber of claim 1, wherein the plasticizer comprises the carboxylic acid amide compound.

3. The semi-aromatic polyamide fiber of claim 1, comprising the plasticizer in a range of from 0.1 to 10 wt. %, based on total semi-aromatic polyamide resin weight.

4. The semi-aromatic polyamide fiber of claim 1, having a single fiber fineness in a range of from 0.1 to 100 dtex.

5. The semi-aromatic polyamide fiber of claim 1, wherein the fiber has a CV value, with N being 20, of fiber diameter of 3% or less, the CV value, in percentage, of the fiber diameter being a value obtained by first, determining a fiber diameter from a diameter of a circumscribed perfect circle of a fiber cut surface that is obtained as a cross section of a single fiber perpendicular to the fiber axis direction; second, obtaining an average value and a standard deviation by measuring thus-determined fiber diameters in a repetition of N being 20; and, third, obtaining the CV value by dividing the standard deviation by the average value.

6. The semi-aromatic polyamide fiber of claim 1, wherein the plasticizer comprises the oligomer having a fluorene skeleton.

7. The semi-aromatic polyamide fiber of claim 1, wherein the aromatic dicarboxylic acid unit is present in the semi-aromatic polyamide fiber in 100 mol. %, relative to the dicarboxylic acid component.

8. The semi-aromatic polyamide fiber of claim 1, wherein the aromatic dicarboxylic acid unit is, in polymerized form, terephthalic acid, isophthalic acid, 2,6-naphthalenedicarboxylic acid, 2.7-naphthalenedicarboxylic acid, 1,4-naphthalenedicarboxylic acid, 1,4-phenylenedioxydiacetic acid, 1,3-phenylenedioxydiacetic acid, diphenic acid, dibenzoic acid, 4,4'-oxydibenzoic acid, diphenylmethane-4,4'-dicarboxylic acid, diphenylsulfone-4,4'-dicarboxylic acid, 4,4'-biphenyldicarboxylic acid, or a mixture thereof.

9. The semi-aromatic polyamide fiber of claim 1, wherein the (ii-a)/(ii-b) molar ratio in a range of from 80:20 to 90:10.

10. The semi-aromatic polyamide fiber of claim 1, wherein the semi-aromatic polyamide resin has a melting point of 295° C. or higher.

11. The semi-aromatic polyamide fiber of claim 1, wherein the semi-aromatic polyamide resin has a melting point of 300° C. or higher.

12. The semi-aromatic polyamide fiber of claim 1, wherein the aromatic dicarboxylic acid unit is present in the semi-aromatic polyamide resin in at least 75 mol. %, relative to the dicarboxylic acid component, and
wherein the plasticizer has a 5% thermal weight reduction temperature of at least 330° C.

13. The semi-aromatic polyamide fiber of claim 1, wherein the plasticizer has a 5% thermal weight reduction temperature of at least 340° C.

14. The semi-aromatic polyamide fiber of claim 1, wherein the plasticizer comprises the carboxylic acid amide, and wherein the carboxylic acid amide comprises, in condensed form, a saturated aliphatic hydroxycarboxylic acid having 12 or more carbon atoms, a saturated aliphatic monocarboxylic acid having 12 or more carbon atoms, and a diamine.

15. The semi-aromatic polyamide fiber of claim 1, wherein the plasticizer comprises the carboxylic acid amide, comprising, in condensed form:

(i) palmitic acid, stearic acid, behenic acid, montanic acid, and/or 12-hydroxystearic acid;

(ii) malonic acid, succinic acid, adipic acid, sebacic acid, pimelic acid, azelaic acid, phthalic acid, terephthalic acid, cyclohexanedicarboxylic acid, and/or cyclohexyl succinic acid; and (iii) ethylenediamine, 1,3-diaminopropane, 1,4-diaminobutane, hexamethylenediamine, meta-xylylenediamine, tolylenediamine, para-xylylenediamine, and/or phenylenediamine, isophoronediamine, such that (i) and/or (ii) are combined with (iii) and wherein the plasticizer further comprises an antioxidant in a range of from 0.1 to 20 wt. %, based on total plasticizer weight.

16. A method for producing the semi-aromatic polyamide fiber of claim 1, the method comprising:

melt-spinning the semi-aromatic polyamide resin in combination with the plasticizer.

17. The method of claim 16, wherein the melt-spinning of the semi-aromatic polyamide resin is carried out at a spinning temperature in a range of from 300 to 350° C.

18. The method of claim 16, wherein the plasticizer is combined with the semi-aromatic polyamide resin in a ratio in a range of from 0.1 to 10% by weight.

19. The method of claim 16, wherein the semi-aromatic polyamide resin to which the plasticizer is added has a melting viscosity in a ranee of from 40 to 150 Pa·s in a melted condition at 310° C. and a shear rate of 1000 sec$^{-1}$.

20. The method of claim 16, wherein the spinning temperature is $T_w+5°$ C. or lower, wherein Tw (° C.) is the 5% thermal weight reduction temperature of the plasticizer.

* * * * *